United States Patent [19]
Santagato

[11] Patent Number: 5,166,662
[45] Date of Patent: Nov. 24, 1992

[54] HOOD ORNAMENT TAMPER DEVICE

[76] Inventor: Charles J. Santagato, 71 Attridge Dr., Aurora, Ontario, Canada, L4G 6J4

[21] Appl. No.: 593,754

[22] Filed: Oct. 5, 1990

[51] Int. Cl.⁵ .............................................. B60Q 1/00
[52] U.S. Cl. ..................................... 340/426; 340/568
[58] Field of Search ............... 340/426, 429, 548, 568, 340/668, 686, 687; 307/10.2; 200/61.93, 538, 543, 331, 332

[56] References Cited

U.S. PATENT DOCUMENTS

| | | | |
|---|---|---|---|
| 3,450,852 | 6/1969 | Rhodes | 200/61.93 |
| 4,137,521 | 1/1979 | Martinez | 340/568 X |
| 4,796,002 | 1/1989 | Heidman, Jr. | 340/428 |
| 4,821,025 | 4/1989 | Ross | 340/568 |
| 4,873,936 | 10/1989 | Ponticelli | 340/426 X |
| 4,882,563 | 11/1989 | Perlman et al. | 340/426 |
| 4,994,785 | 2/1991 | Perlman et al. | 340/426 |
| 5,059,945 | 10/1991 | Scheele et al. | 340/426 |
| 5,075,668 | 12/1991 | Butte | 340/426 |

FOREIGN PATENT DOCUMENTS 9007758 7/1990 World Int. Prop. O. ........ 340/426

Primary Examiner—Jin F. Ng
Assistant Examiner—Brian R. Tumm

[57] ABSTRACT

An automobile alarm device, for an automobile of the type having an ornament mounted on a front part of the vehicle, such ornament incorporating a spring loaded mount, and the alarm device having a bracket attachable to the ornament, side portions extending from the bracket along at least one side of the ornament, a spring-loaded resilient arm member extending from the bracket transversely across the axis of the hood ornament, and being connected to the hood ornament so that movement of the hood ornament causes the arm to be deflected, and, electrical contacts positioned on the bracket and adapted to be contacted by the arm upon such deflection, the electrical contacts being connected to a source of electrical power, and to an alarm device, so as to activate the alarm.

4 Claims, 1 Drawing Sheet

HOOD ORNAMENT TAMPER DEVICE

FIELD OF THE INVENTION

The invention relates to an alarm device automobiles and in particular to an alarm device for attachment to hood ornament, to be activated upon tampering with the ornament.

BACKGROUND OF THE INVENTION

Hood ornaments on automobiles are prime targets for vandals. Cars with removeable hood ornaments are usually luxury cars, and such vandals are quick to seize on any opportunity to vandalize cars of this type.

Clearly it is desirable to provide some form of alarm device which is activated by anyone tampering with the hood ornament, before the ornament can become damaged.

Various proposals have been made in the past for this purpose. However, in most of these proposals it has been necessary to more or less incorporate the alarm device in the automobile as it was manufactured. Clearly, it is desirable to provide such an alarm device which can be retro-fitted to an existing automobile, without disturbing the construction or design of the automobile.

The great majority of hood ornaments of this type incorporate some form of spring loading attachment. The reason for this, is simply safety. In the event of an accident, the hood ornament is then readily deflected so as to minimize risk of injury or damage.

BRIEF SUMMARY OF THE INVENTION

With a view to satisfying the various conflicting objectives noted above, the invention comprises an automobile alarm device, for an automobile of the type having an ornament mounted on a front part of the vehicle, such ornament incorporating a spring loaded mount, said alarm device comprising, bracket means attachable to said ornament, side portions extending from said bracket means along at least one side of said ornament, and spaced therefrom, a spring-loaded resilient arm member extending from said bracket means transversely across the axis of said hood ornament, and means connecting said arm means to said hood ornament whereby upon movement of said hood ornament, said arm is deflected, and, electrical contact means positioned on said bracket and adapted to be contacted by said arm means upon such deflection, said electrical contact means being adapted to be connected to a source of electrical power, and to an alarm device, whereby to activate said alarm device.

More particularly, the invention comprises such an automobile alarm device and wherein said bracket means comprises a generally U-shaped bracket in section, defining a web portion and two side arms, an opening means through said web portion, for receiving a portion of said ornament therethrough, and said arm means being attached to one of said side arms, and said electrical contact means being attached to the other of said side arm.

More particularly, the invention provides such an automobile alarm device wherein said arm means comprises a flexible resilient arm member, and means securing same to said one side arm of said bracket, and extending transversely thereto as a flange.

More particularly, the invention comprises an alarm device of the type described and wherein said electrical contact means comprises a sleeve portion, threaded means on the exterior of said sleeve portion, and a nut received on said sleeve portion whereby the position of said electrical contact means may be adjusted relative to said transverse arm.

The various features of novelty which characterize the invention are pointed out with particularity in the claims annexed to and forming a part of this disclosure. For a better understanding of the invention, its operation advantages and specific objects attained by its use, reference should be had to the accompanying drawings and descriptive matter in which there are illustrated and described preferred embodiments of the invention.

IN THE DRAWINGS

FIG. 1 is a perspective illustration of an automobile alarm device in accordance with the invention, and FIG. 2 is a schematic view partially along the line of 2—2 of FIG. 1.

DESCRIPTION OF A SPECIFIC EMBODIMENT

Figure 1:
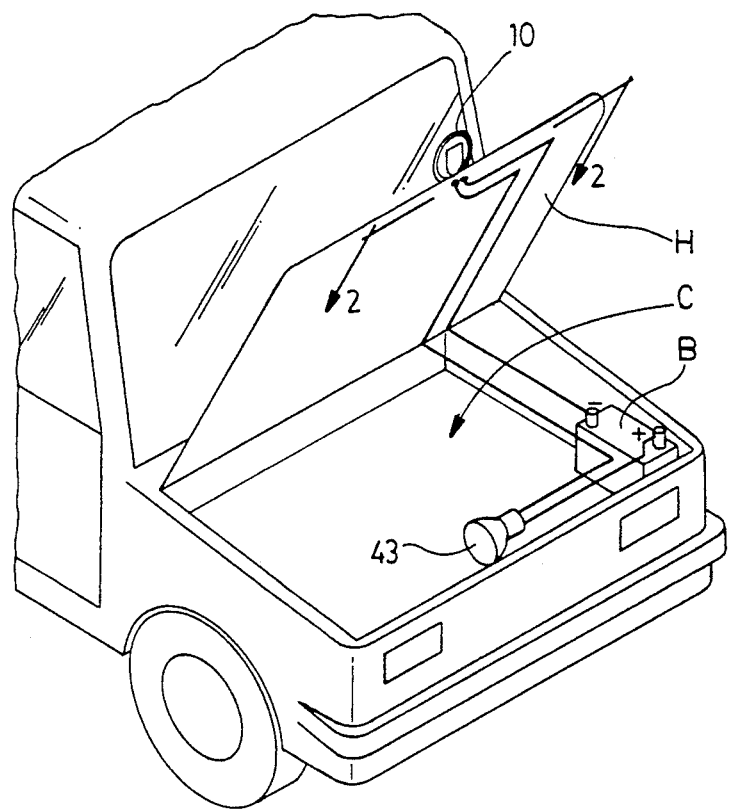

Referring now to FIG. 1, it will be seen that in this embodiment of the invention, the front end of an automobile is indicated as having a typical engine compartment C and hood H. Typically, the automobile ornament is mounted either on the hood H, or on a front portion of the automobile engine compartment C, and is typically mounted on some form of spring loaded column incorporated inside the automobile for reasons of safety. Such a hood ornament is indicated generally as a 10 in this embodiment. Various different forms of hood ornaments are available from different manufacturers.

Figure 2:
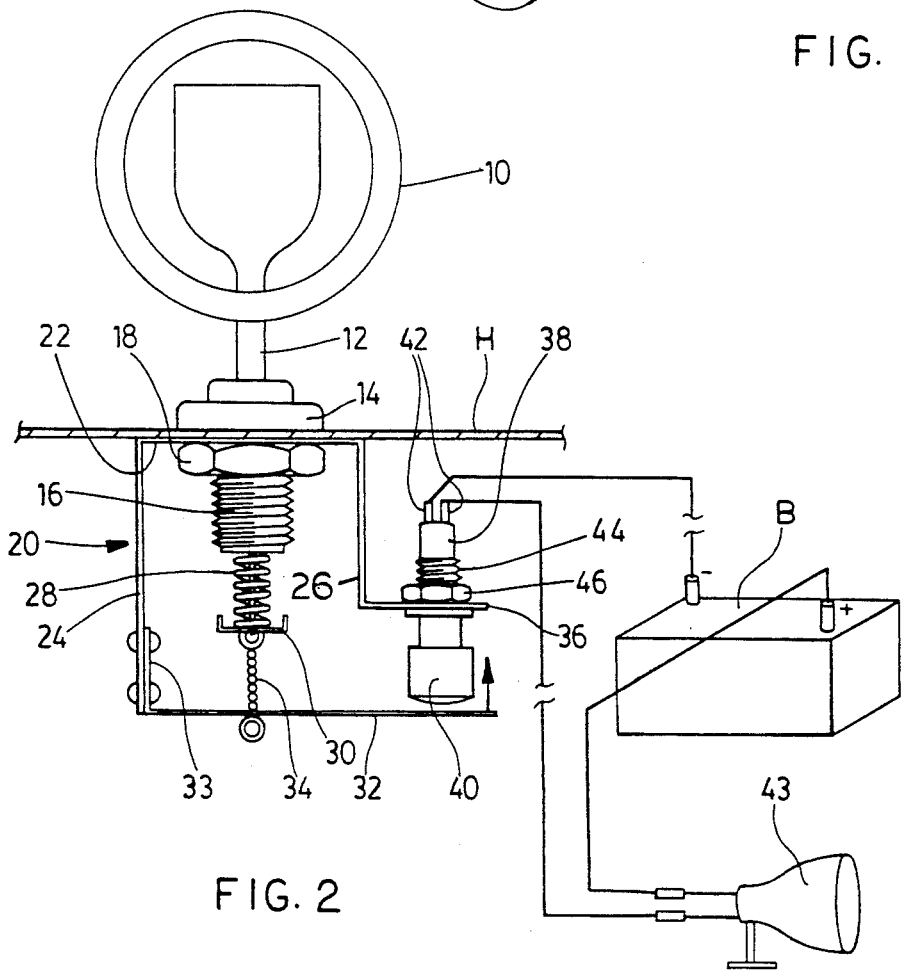

Referring now to FIGS. 2, it will be seen that the hood ornament 10 is mounted on the column 12. The column 12 is in turn provided with a collar 14, and a threaded neck 16 adapted to extend through a hole in the automobile body or hood. The nut 18 is secured by means of a bracket 20.

The alarm device in accordance with the invention will be seen to comprise a bracket indicated generally as 20 having a web portion 22 and a side portion 24 and a further side portion 26.

The bracket 20 is formed out of a rectangular panel of sheet metal, bent into a suitable shape, in section as shown. A suitable hole (not shown) is pierced through web 22 to receive a neck 16.

In this way removal of the nut 18 will permit the bracket 20 to be secured to the neck 16 of the ornament 10 by means of the nut 18.

The neck portion 16 of the ornament 10 is a hollow cylinder, and receives a spring 28, retained on a wire cage device 30. The wire cage device 30 is connected to the column 12. Any deflection of the column 12 will thus shorten the cage device 30 thereby compressing the spring 28. In this way, as is well known, the ornament 10 is in effect provided with a spring-loaded attachment.

The invention makes use of this factor in the following manner. Secured to side portion 24 of bracket 20, is a transverse resilient flexible arm preferably of spring steel 32, having a short L-shaped portion 33 riveted to the lower end of the side portion 24.

Part way along the arm 32 there is a suitable hole (not shown) and a pull-chain 34 is secured to the arm 32 and to the wire cage device 30. In this way any movement of the ornament 10 is communicated to the arm 32 as a deflection thereof. The spring nature of the arm 32 will maintain the chain 34 in tension.

The other side member 26 of the bracket 20 is formed with a L-shaped flange 36. An opening is formed (not shown) through flange 36 and receives a generally cylindrical switch body 38. Switch body 38 has a moveable push-button contact 40 at its lower end. At its upper end it has two contacts 42 which can be connected to a source of power i.e. battery B and to an alarm device such as a horn 43. On the exterior of body 38, threads 44 are provided which can receive nuts 46. In this way the exact position of the body 38 relative to the arm 32 can be adjusted.

In operation, if anyone should attempt to tamper with the ornament 10, it will cause shortening of the cage 30. This will pull chain 34 and arm 32 will close contact push-button 40 of switch 38. This will cause electrical current to flow from the power source B to the alarm device such as a horn 43, thereby sounding an alarm.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. An automobile alarm device, for an automobile of the type having an ornament mounted on a front part of the vehicle, said ornament incorporating a spring loaded ornament mount and defining an axis, said alarm device comprising:

bracket means attachable to said ornament mount;

first and second side portions forming part of said bracket means and extending from said bracket means normal thereto alongside opposite sides of said ornament mount;

resilient arm means extending from said first side portion transversely across said axis of said ornament mount;

means connecting said resilient arm means to said hood ornament whereby upon movement of said hood ornament, said resilient arm means is deflected, and, electrical contact means positioned on said second side portion and adapted to be contacted by said resilient arm means upon said deflection, said electrical contact means being adapted to be connected to a source of electrical power, and to an alarm, whereby to activate said alarm.

2. An automobile alarm device as claimed in claim 1 and wherein said bracket means comprises a generally U-shaped bracket in section, defining a web portion and said two side portions, and opening means through said web portion, for receiving a portion of said ornament mount therethrough.

3. An automobile alarm device as claimed in claim 2 wherein said resilient arms means comprises a flexible resilient arm member, and means securing the resilient arm member to said first side portion of said bracket means, and extending transversely thereto.

4. An automobile alarm device as claimed in claim 1 and wherein said electrical contact means comprises a body portion, a threaded portion on the exterior of said body portion, and a nut received on said body portion whereby the position of said electrical contact means may be adjusted relative to said resilient arm means.

* * * * *